(12) United States Patent
We et al.

(10) Patent No.: US 10,761,699 B2
(45) Date of Patent: ***Sep. 1, 2020

(54) VIRTUAL OPENING OF BOXES AND PACKS OF CARDS

(71) Applicant: Hothead Games Inc., Vancouver (CA)

(72) Inventors: Art We, Tsawwassen (CA); Trevor Lim, Vancouver (CA); Gregan Dunn, North Vancouver (CA)

(73) Assignee: Hothead Games Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,872

(22) Filed: Nov. 30, 2018

(65) Prior Publication Data

US 2019/0095081 A1 Mar. 28, 2019

Related U.S. Application Data

(63) Continuation of application No. 14/874,184, filed on Oct. 2, 2015, now Pat. No. 10,156,970, which is a
(Continued)

(51) Int. Cl.
| | | |
|---|---|---|
| *G06F 3/048* | (2013.01) | |
| *G06F 3/0484* | (2013.01) | |
| *G06F 3/0482* | (2013.01) | |
| *G06F 3/0481* | (2013.01) | |
| *G06F 3/01* | (2006.01) | |

(Continued)

(52) U.S. Cl.
CPC .......... *G06F 3/04842* (2013.01); *G06F 3/016* (2013.01); *G06F 3/0481* (2013.01); *G06F 3/0482* (2013.01); *G06F 3/04883* (2013.01); *G06T 13/80* (2013.01)

(58) Field of Classification Search
CPC .......... G06F 3/048; G06F 3/016; G06T 13/80
See application file for complete search history.

(56) References Cited

U.S. PATENT DOCUMENTS

| | | | |
|---|---|---|---|
| 5,662,332 A | 9/1997 | Garfield | |
| 5,772,512 A | 6/1998 | Chichester | |

(Continued)

FOREIGN PATENT DOCUMENTS

| | | |
|---|---|---|
| CA | 2403006 A1 | 9/2001 |
| CA | 2763349 A1 | 7/2012 |

(Continued)

OTHER PUBLICATIONS

"Office Action," Korean Patent Application No. 10-2016-0098421, dated May 15, 2018, 4 pages [8 pages including translation].

(Continued)

*Primary Examiner* — Xuyang Xia
(74) *Attorney, Agent, or Firm* — Carr & Ferrell LLP

(57) ABSTRACT

Systems and methods for virtual opening of packages such as boxes and packs of cards are provided herein. Exemplary systems may execute methods via one or more processors, which are programmed to generate a visual representation of a package, receive input from the user, the input indicating opening of the package, and provide feedback to the user corresponding to the opening of the package that at least partially mimics a physical opening of the package.

20 Claims, 8 Drawing Sheets

Related U.S. Application Data continuation of application No. 13/760,986, filed on Feb. 6, 2013, now Pat. No. 9,195,369.

(60) Provisional application No. 61/595,509, filed on Feb. 6, 2012.

(51) Int. Cl.
*G06F 3/0488* (2013.01)
*G06T 13/80* (2011.01)

(56) References Cited

U.S. PATENT DOCUMENTS

| | | |
|---|---|---|
| 5,813,913 A | 9/1998 | Berner et al. |
| 6,174,237 B1 | 1/2001 | Stephenson |
| 6,648,760 B1 | 11/2003 | Nicastro |
| 7,666,094 B2 | 2/2010 | Baerlocher et al. |
| 7,867,086 B2 | 1/2011 | Sitrick |
| 7,881,976 B2 | 2/2011 | Dayton et al. |
| 8,002,618 B1 | 8/2011 | Lockton et al. |
| 8,149,530 B1 | 4/2012 | Lockton et al. |
| 8,209,628 B1 | 6/2012 | Davidson |
| 8,291,492 B2 | 10/2012 | McNally et al. |
| 8,365,074 B1 | 1/2013 | Wagner et al. |
| 8,385,596 B2 | 2/2013 | Latta et al. |
| 8,597,142 B2 | 12/2013 | Mayles et al. |
| 8,608,485 B2 | 12/2013 | Teasdale et al. |
| 8,619,080 B2 | 12/2013 | Avent et al. |
| 8,645,396 B2 | 2/2014 | McNally et al. |
| 8,684,820 B2 | 4/2014 | DeYoung |
| 9,056,251 B2 | 6/2015 | Lockton |
| 9,195,369 B2 | 11/2015 | We et al. |
| 9,254,437 B2 | 2/2016 | Short et al. |
| 9,283,480 B2 | 3/2016 | DeYoung |
| 9,286,752 B2 | 3/2016 | Robbins et al. |
| 9,586,145 B2 | 3/2017 | DeYoung |
| 9,652,937 B2 | 5/2017 | Lockton |
| 9,729,765 B2 | 8/2017 | Balakrishnan et al. |
| 9,919,213 B2 | 3/2018 | Dunn |
| 10,004,991 B2 | 6/2018 | Ceraldi et al. |
| 10,010,791 B2 | 7/2018 | Ceraldi et al. |
| 10,156,970 B2 | 12/2018 | We et al. |
| 10,589,175 B2 | 3/2020 | Ceraldi et al. |
| 2001/0025253 A1 | 9/2001 | Heintz et al. |
| 2002/0043764 A1 | 4/2002 | Imhof |
| 2002/0142842 A1 | 10/2002 | Easley et al. |
| 2003/0038805 A1 | 2/2003 | Wong et al. |
| 2003/0127798 A1 | 7/2003 | Burrowes |
| 2004/0193484 A1 | 9/2004 | Allen |
| 2004/0227292 A1 | 11/2004 | Bodish |
| 2005/0079912 A1 | 4/2005 | Hanafusa |
| 2005/0184457 A1 | 8/2005 | Frieman |
| 2005/0282614 A1 | 12/2005 | Gauselmann |
| 2006/0082068 A1 | 4/2006 | Patchen |
| 2006/0135232 A1 | 6/2006 | Willis |
| 2006/0242554 A1 | 10/2006 | Gerace et al. |
| 2006/0284852 A1 | 12/2006 | Hofmeister et al. |
| 2006/0287106 A1 | 12/2006 | Jensen |
| 2007/0015586 A1 | 1/2007 | Huston |
| 2007/0087835 A1 | 4/2007 | Van Luchene |
| 2007/0152984 A1 | 7/2007 | Ording et al. |
| 2007/0191101 A1 | 8/2007 | Coliz et al. |
| 2007/0191102 A1 | 8/2007 | Coliz et al. |
| 2007/0265063 A1 | 11/2007 | McNally |
| 2008/0026847 A1 | 1/2008 | Mueller et al. |
| 2008/0058092 A1 | 3/2008 | Schwartz et al. |
| 2008/0090659 A1 | 4/2008 | Aguilar et al. |
| 2008/0147424 A1 | 6/2008 | Rowan et al. |
| 2008/0163055 A1 | 7/2008 | Ganz et al. |
| 2008/0215420 A1 | 9/2008 | Angelica |
| 2008/0228580 A1 | 9/2008 | Korman et al. |
| 2008/0261680 A1 | 10/2008 | Buecheler et al. |
| 2008/0270240 A1* | 10/2008 | Chu .............. G06Q 10/06375 705/14.11 |
| 2009/0043868 A1 | 2/2009 | Hathaway |
| 2009/0072483 A1 | 3/2009 | Salomon et al. |
| 2009/0149236 A1 | 6/2009 | Van Luchene |
| 2009/0153389 A1 | 6/2009 | Kerr et al. |
| 2009/0157491 A1 | 6/2009 | Brougher et al. |
| 2009/0164937 A1 | 6/2009 | Alviar et al. |
| 2009/0165128 A1 | 6/2009 | McNally et al. |
| 2009/0181770 A1 | 7/2009 | Viner et al. |
| 2009/0209335 A1 | 8/2009 | Pearce |
| 2009/0322498 A1 | 12/2009 | Yun et al. |
| 2010/0060661 A1 | 3/2010 | Avent et al. |
| 2010/0063993 A1 | 3/2010 | Higgins et al. |
| 2010/0082798 A1 | 4/2010 | Bhogal et al. |
| 2010/0122174 A1 | 5/2010 | Snibbe et al. |
| 2010/0123658 A1 | 5/2010 | Demuynck et al. |
| 2010/0203952 A1 | 8/2010 | Zalewski |
| 2010/0261526 A1* | 10/2010 | Anderson ............... G06F 3/017 463/31 |
| 2010/0268580 A1 | 10/2010 | Vermes |
| 2010/0324981 A1 | 12/2010 | Etchegoyen |
| 2011/0028219 A1 | 2/2011 | Heatherly et al. |
| 2011/0095993 A1 | 4/2011 | Zuverink |
| 2011/0165926 A1 | 7/2011 | Hall |
| 2011/0183738 A1 | 7/2011 | Kirnstotter |
| 2011/0184791 A1 | 7/2011 | Wang |
| 2011/0185318 A1* | 7/2011 | Hinckley ............ G06F 3/04883 715/863 |
| 2011/0264491 A1* | 10/2011 | Birnbaum ............... G06F 3/016 705/14.4 |
| 2011/0264532 A1 | 10/2011 | Chan et al. |
| 2011/0300916 A1 | 12/2011 | Patchen |
| 2011/0300923 A1 | 12/2011 | Van Luchene |
| 2011/0306428 A1 | 12/2011 | Lockton et al. |
| 2012/0023444 A1 | 1/2012 | Patil et al. |
| 2012/0029990 A1 | 2/2012 | Fisher |
| 2012/0058808 A1 | 3/2012 | Lockton |
| 2012/0109728 A1 | 5/2012 | Sparks |
| 2012/0184349 A1 | 7/2012 | Barclay et al. |
| 2012/0232973 A1 | 9/2012 | Robb et al. |
| 2012/0246301 A1 | 9/2012 | Vyrros et al. |
| 2012/0274662 A1 | 11/2012 | Kim et al. |
| 2012/0290308 A1 | 11/2012 | Detwiller et al. |
| 2012/0290654 A1 | 11/2012 | Detwiller et al. |
| 2012/0309477 A1 | 12/2012 | Mayles et al. |
| 2013/0112202 A1 | 5/2013 | Fogelbrink |
| 2013/0127731 A1 | 5/2013 | Song et al. |
| 2013/0184040 A1 | 7/2013 | Nonaka et al. |
| 2013/0203480 A1 | 8/2013 | DeYoung |
| 2013/0205255 A1 | 8/2013 | We et al. |
| 2013/0218733 A1 | 8/2013 | Rago et al. |
| 2013/0288787 A1 | 10/2013 | Yoshie et al. |
| 2013/0296036 A1 | 11/2013 | Scott |
| 2013/0310169 A1 | 11/2013 | Satsuma |
| 2013/0344960 A1 | 12/2013 | Perry et al. |
| 2014/0047380 A1 | 2/2014 | Mak |
| 2014/0118563 A1 | 5/2014 | Mehta et al. |
| 2014/0179409 A1 | 6/2014 | DeYoung |
| 2014/0200061 A1 | 7/2014 | Isa et al. |
| 2014/0210164 A1 | 7/2014 | MacDonald et al. |
| 2014/0256389 A1 | 9/2014 | Wentling et al. |
| 2014/0274239 A1 | 9/2014 | Han |
| 2014/0274409 A1 | 9/2014 | Tinsman et al. |
| 2014/0325429 A1 | 10/2014 | Chang |
| 2014/0349723 A1 | 11/2014 | Nakatani et al. |
| 2014/0358632 A1 | 12/2014 | Graff et al. |
| 2014/0378222 A1 | 12/2014 | Balakrishnan et al. |
| 2015/0046856 A1 | 2/2015 | Rucker et al. |
| 2015/0094150 A1 | 4/2015 | Gregory et al. |
| 2015/0182854 A1 | 7/2015 | Edsall et al. |
| 2015/0182856 A1 | 7/2015 | Mays, III et al. |
| 2015/0238862 A1 | 8/2015 | Suzuki |
| 2015/0382066 A1 | 12/2015 | Heeter et al. |
| 2016/0023106 A1 | 1/2016 | Mizuno |
| 2016/0026369 A1 | 1/2016 | We et al. |
| 2016/0096111 A1 | 4/2016 | DeYoung |
| 2016/0096113 A1 | 4/2016 | Decoufle |
| 2016/0236078 A1 | 8/2016 | Tokunaga |
| 2017/0014718 A1 | 1/2017 | Ceraldi et al. |
| 2017/0028303 A1 | 2/2017 | DeYoung |
| 2017/0036119 A1 | 2/2017 | Nielsen et al. |

(56) References Cited

U.S. PATENT DOCUMENTS

| | | | |
|---|---|---|---|
| 2017/0072315 | A1 | 3/2017 | Wada et al. |
| 2017/0319961 | A1 | 11/2017 | Dunn |
| 2017/0368460 | A1 | 12/2017 | Ceraldi et al. |
| 2017/0368461 | A1 | 12/2017 | Ceraldi et al. |
| 2018/0154261 | A1 | 6/2018 | Ceraldi et al. |
| 2018/0214773 | A1 | 8/2018 | Ceraldi et al. |
| 2020/0206624 | A1 | 7/2020 | Ceraldi et al. |

FOREIGN PATENT DOCUMENTS

| | | | |
|---|---|---|---|
| EP | 2182421 | A1 | 5/2010 |
| EP | 2812088 | A1 | 12/2014 |
| EP | 2812830 | A1 | 12/2014 |
| EP | 3117883 | A1 | 1/2017 |
| EP | 3127587 | A1 | 2/2017 |
| JP | 2001286678 | A | 10/2001 |
| JP | 2001340656 | A | 12/2001 |
| JP | 2002253859 | A | 9/2002 |
| JP | 2003135854 | | 5/2003 |
| JP | 2004195165 | A | 7/2004 |
| JP | 2005270649 | | 10/2005 |
| JP | 2006014956 | A | 1/2006 |
| JP | 2006094877 | A | 4/2006 |
| JP | 2007061317 | A | 2/2007 |
| JP | 2007215721 | | 8/2007 |
| JP | 2008508600 | A | 3/2008 |
| JP | 2009526603 | | 7/2009 |
| JP | 2009195415 | | 9/2009 |
| JP | 2009205462 | A | 9/2009 |
| JP | 2010088560 | A | 4/2010 |
| JP | 2010131083 | | 6/2010 |
| JP | 2010148812 | A | 7/2010 |
| JP | 2010167251 | | 8/2010 |
| JP | 2011172253 | A | 9/2011 |
| JP | 2012043266 | A | 3/2012 |
| JP | 4975880 | B1 | 7/2012 |
| JP | 2012133745 | A | 7/2012 |
| JP | 2012160171 | A | 8/2012 |
| JP | 2013208219 | A | 10/2013 |
| JP | 2013226232 | A | 11/2013 |
| JP | 2014171860 | A | 9/2014 |
| JP | 2015008984 | A | 1/2015 |
| JP | 2015073745 | A | 4/2015 |
| JP | 2015077366 | A | 4/2015 |
| JP | 2015091291 | A | 5/2015 |
| JP | 6235084 | B2 | 11/2017 |
| JP | 6243356 | B2 | 11/2017 |
| JP | 6345734 | B2 | 6/2018 |
| JP | 6523367 | B2 | 5/2019 |
| KR | 100507587 | B1 | 8/2005 |
| KR | 1020070090730 | A | 9/2007 |
| KR | 1020100069730 | A | 6/2010 |
| KR | 1020100124428 | A | 11/2010 |
| KR | 1020110017188 | A | 2/2011 |
| KR | 1020170008697 | A | 1/2017 |
| KR | 1020170016801 | | 2/2017 |
| KR | 101725073 | | 4/2017 |
| KR | 101754318 | B1 | 6/2017 |
| KR | 1020170124964 | A | 11/2017 |
| KR | 101919898 | | 11/2018 |
| WO | WO2001069364 | A2 | 9/2001 |
| WO | WO2011019188 | A2 | 2/2011 |
| WO | WO2013116926 | A1 | 8/2013 |
| WO | WO2013119702 | A1 | 8/2013 |
| WO | WO2014103634 | A1 | 7/2014 |
| WO | WO2017190228 | A1 | 11/2017 |
| WO | WO2018000085 | A1 | 1/2018 |

OTHER PUBLICATIONS

"Notice of Allowance," European Patent Application No. 16179484.7, dated Jun. 29, 2018, 7 pages.
"Office Action," Japan Patent Application No. 2017-081022, dated Jul. 3, 2018, 5 pages [9 pages including translation].
VintageBeef. "Let's Play Journey—EP1—Sandy" [online], Mar. 14, 2012 [retrieved on Aug. 26, 2018]. Retrieved from the Internet: <URL: https://www.youtube.com/watch?v=v0vnalRwlgM>.
Constantin, C.I. et al. "Tilt-controlled mobile games: Velocity-control vs. position-control." Proceedings of the 6th IEEE Consumer Electronics Society Games, Entertainment, Media Conference—IEEE-GEM 2014, pp. 24-30. [retrieved on Aug. 26, 2018]. Retrieved from the Internet: <URL: https://www.yorku.ca/mack/ieeegem2014a.html>.
"Notice of Allowance," Korea Patent Application No. 10-2016-0098421, dated Aug. 22, 2018, 2 pages [3 pages including translation].
"Office Action," Korea Patent Application No. 10-2017-0052810, dated Oct. 19, 2018, 2 pages [4 pages including translation].
"Notice of Allowance," Japan Patent Application No. 2017-081022, dated Apr. 2, 2019, 3 pages.
Patent Cooperation Treaty Application No. PCT/US2013/024981, "International Search Report" and "Written Opinion of the International Searching Authority," dated Apr. 15, 2013, 14 pages.
Patent Cooperation Treaty Application No. PCT/CA 2013/000101, "International Search Report" and Written Opinion of the International Searching Authority, dated Apr. 15, 2013, 10 pages.
Extended European Search Report dated Dec. 11, 2014 in European Application No. 13746851.8, 6 pages.
Extended European Search Report dated Apr. 16, 2015 in European Application No. 13746523.3, 6 pages.
Dix, A., "Deconstructing Experience—pulling crackers apart" in: Blythe Funology: From Usability to Enjoyment, Human-Computer Interaction Series, (Dordecht, the Netherlands: Kluwer, 2003) ISBN 978-1-4020-2967-7, Ch. 13, pp. 165-178.
Office Action dated Aug. 28, 2015 in Korean Patent Application No. 10-2014-7024906 filed Sep. 4, 2014, 8 pages [19 pages including translation].
Office Action dated Nov. 11, 2015 in European Patent Application No. 13746851.8 filed Sep. 3, 2014, 5 pages.
Office Action dated Dec. 28, 2015 in Korean Patent Application No. 10-2014-7024936 filed Sep. 4, 2014, 7 pages [15 pages including translation].
Office Action dated Apr. 25, 2016 in Korean Patent Application No. 10-2014-7024906 filed Feb. 6, 2013, 5 pages [12 pages including translation].
RRvirus, Sniper X, Sep. 24, 2015, https://www.youtube.com/watch?v=v8LHzH9HVbl, 4 pages.
RRvirus, Hitman: Sniper, Jun. 4, 2015, https://www.youtube.com/watch?v=cJ4CPZUIzWg, 1 page.
Office Action dated Jul. 27, 2016 in Korean Patent Application No. 10-2014-7024936 filed Feb. 6, 2013, 4 pages [9 pages including translation].
Office Action dated Jun. 8, 2016 in European Patent Application No. 13746851.8 filed Feb. 6, 2013, 5 pages.
Ninja Theory Ltd, "Heavenly Sword manual" [online], Oct. 29, 2008 [retrieved on Sep. 16, 2016], Retrieved from the Internet: <URL:https://web.archive.org/web/20081029234359/http://fp.scea.com/Content/games/BCUS-98132/manual/manual.pdf>, 27 pages.
EightBitHD, "Heavenly Sword Walkthrough/Gameplay PS3 HD #1" [online], Oct. 7, 2012 [retrieved on Sep. 16, 2016], Retrieved from the Internet: <URL:https://www.youtube.com/watch?v=qhOUHxsZKLU>, 3 pages.
Fouquet, Pierre, "A matter of slow death—Kill Cams: X-Ray Bullet Time" [online], Mar. 26, 2016 [retrieved on Sep. 16, 2016], Retrieved from the Internet: <URL:http://www.gameskinny.com/o408c/a-matter-of-slow-death-kill-cams-x-ray-bullet-time>, 7 pages.
Artman_12, "Camera orbit around 3d object using swipe" [online], Dec. 14, 2013 [retrieved Sep. 17, 2016], Retrieved from the Internet:<URL:http://answers.unity3d.com/questions/596739/camera-orbit-around-3d-object-using-swipe.html>, 5 pages.
Rebellion, "Sniper Elite III manual" [online], Feb. 6, 2014 [retrieved Sep. 17, 2016], Retrieved from the Internet: <URL: http://cdn.akami.steamstatic.com/steam/apps/238090/manuals/SE3_PC_ENG_Manual.pdf>, 9 pages.
Office Action dated Nov. 29, 2016 in Korean Patent Application No. 10-2014-7024906 filed Feb. 6, 2013, 3 pages [7 pages including translation].

(56) References Cited

OTHER PUBLICATIONS

South Korean Patent Application No. 1020147024936, "Notice of Allowance," Jan. 11, 2017, 2 pages [3 pages including translation].
Office Action dated Dec. 13, 2016 in Japanese Patent Application No. 2014-555857 filed Feb. 6, 2013, 6 pages [12 pages including translation].
"Extended European Search Report" and "Written Opinion," European Patent Application No. 16182337.2, dated Dec. 2, 2016, 10 pages.
"Hearthstone: Heroes of Warcraft," from Wikipedia, the Free Encyclopedia [online], Jul. 29, 2015 [retrieved on Nov. 23, 2016], Retrieved from the Internet: <URL:https://en.wikipedia.org/w/index.php?title=Hearthstone:_Heroes_of_Warcraft&oldid=673644287>, 12 pages.
"Extended European Search Report" and "Written Opinion," European Patent Application No. 16179484.7, dated Dec. 7, 2016, 10 pages.
"Office Action," South Korea Patent Application No. 1020147024906, dated Jan. 26, 2017, 3 pages [6 pages including translation].
"Office Action," European Patent Application No. 13746851.8, dated Dec. 9, 2016, 4 pages.
"Office Action," Japanese Patent Application No. 2014-555047, dated Feb. 7, 2017, [7 pages including translation].
Rrvirus. Kill Shot (by Hothead Games)—iOS—iPhone/iPad/iPod Touch Gameplay [online]. Jun. 15, 2014 [retrieved Feb. 22, 2017]. Retrieved from the Internet: <URL:https://www..youtube.com/watch?v=q3QjzIgKscw>, 4 pages.
Falcon 4.0 Manual. 1998 [retrieved on Feb. 10, 2017]. Retrieved from the Internet: <URL:http://download.high-g.net/files/Falcon_4_Manuals/f4_manual.pdf>, 24 pages.
Chalk, Andy. Sniper Elite 3 Unveils Ridiculously Graphic "X-Ray Killcam" [online]. Feb. 17, 2014 9:25 PM [retrieved Feb. 22, 2017]. Retrieved from the Internet: <URL:http://www.escapistmagazine.com/news/view/132299-Sniper-Elite-3-Unveils-Ridiculously-Graphic-X-Ray-Killcam>, 1 page.
"Notice of Allowance," South Korea Patent Application No. 1020147024906, dated Apr. 20, 2017, 2 pages [3 pages including translation].
Marc the Geek, Hitman Sniper for Android Review, Jun. 5, 2015, https://www.youtube.com/watch?v=alMb7qtWnSA , times 1:52-1:54, 2:44-2:49, 3:38-3:40, 4:26-4:28, 4:48-4:54, 1 page.
"Dámon," Computer Fachlexikon Fachwörterbuch, Microsoft Press, Third Edition, 1997, 3 pages.
"Daemon (computing)," Wikipedia, Jun. 22, 2016. Retrieved from the Internet: <URL:https://en.wikipedia.org/w/index.php?title=Daemon_(computing)&oldid=726414138), 4 pages.
"Notice of Allowance," European Patent Application No. 13746851.8, dated Jul. 18, 2017, 7 pages.
"Office Action," Japanese Patent Application No. 2014-555857, dated Jun. 20, 2017, [16 pages including translation].
"International Search Report" and "Written Opinion of the International Searching Authority," Patent Cooperation Treaty Application No. PCT/CA2017/050501, dated Aug. 8, 2017, 8 pages.
"Office Action," Japan Patent Application No. 2016-138659, dated Sep. 5, 2017, 7 pages (15 pages including translation).
"Daemon," Tech Terms, Sep. 22, 2017. Retrieved from the Internet: <URL:https://techterms.com/definition/daemon), 1 page.
"Notice of Allowance," Japanese Patent Application No. 201615985, dated Sep. 26, 2017, 3 pages.
Omnomnick. CS:GO Update Adds Custom Weapon Skins [online]. Oct. 25, 2013 [retrieved Jun. 30, 2017]. Retrieved from the Internet: <URL:http://www.valvetime.net/threads/cs-go-update-adds-custom-weapon-skins.244024/>, 5 pages.
"International Search Report" and "Written Opinion of the International Searching Authority," Patent Cooperation Treaty Application No. PCT/CA2017/050775, dated Sep. 20, 2017, 9 pages.
"Notice of Allowance," Japan Patent Application No. 2014-555047, dated Oct. 17, 2017, 3 pages.
"Office Action," European Patent Application No. 16179484.7, dated Aug. 30, 2017, 7 pages.
"Office Action," Japan Patent Application No. 2014-555857, dated Feb. 27, 2018, 6 pages [13 pages including translation].
"Summons to Attend Oral Proceedings," European Patent Application No. 16182337.2, dated Jan. 16, 2018, 8 pages.
"Notice of Allowance," Japan Patent Application No. 2016-138659, dated Apr. 24, 2018, 3 pages.
"Office Action," Korea Patent Application No. 10-2017-0052810, dated Apr. 26, 2018, 4 pages [8 pages including translation].
Dove, arma 3 Sniper Guide, Jan. 10, 2016, https://www.youtube.com/watch?v=eyLkNOEGido, 1 page.
TouchGameplay, Sniper X Featuring Jason Statham (by Glu Games Inc.), Sep. 23, 2015, https://www.youtube.com/watch?v=JrMkZsf3Pq4, 1 page.

* cited by examiner

VIRTUAL OPENING OF BOXES AND PACKS OF CARDS

CROSS REFERENCE TO RELATED APPLICATIONS

This non-provisional patent application is a continuation of U.S. Pat. No. 10,156,970, issued on Dec. 18, 2018, which is a continuation of U.S. Pat. No. 9,195,369, issued on Nov. 24, 2015, which claims benefit to U.S. Provisional Patent Application Ser. No. 61/595,509, filed on Feb. 6, 2012, all of which are hereby incorporated by reference herein in their entirety including all references cited therein.

FIELD OF THE PRESENT TECHNOLOGY

The present technology relates generally to virtual opening of boxes and packs of cards. Generally, embodiments of the present invention include methods in which an interactive software displays virtual boxes and packs of trading cards and allows for the player to interact with and open the virtual boxes and package of cards as if they were real, with the goal of providing satisfaction and engagement to the user through the use of touch screen and mouse interaction with the boxes and packs

BACKGROUND

Traditionally, the opening of boxes and packs of cards comprise physical activities applied to boxes or playing cards that exist in physical embodiments or tangible mediums. For example, physical boxes or packs of cards are opened by tearing, ripping, unfolding, or otherwise removing at least a portion of the box or package of cards to expose or reveal what is contained therein.

SUMMARY OF THE PRESENT TECHNOLOGY

According to some embodiments, the present technology may be directed to a system that comprises: (a) one or more processors; and (b) logic encoded in one or more tangible media for execution by the one or more processors and when executed operable to perform operations comprising: (i) generating a visual representation of a package; (ii) receiving input from the user, the input indicating opening of the package; and (iii) providing feedback to the user corresponding to the opening of the package that at least partially mimics a physical opening of the package.

According to some embodiments, the present technology may be directed to a system that comprises: (a) one or more processors; and (b) logic encoded in one or more tangible media for execution by the one or more processors and when executed operable to perform operations comprising: (i) executing a program environment that includes a virtual store; (ii) providing a plurality of packs of cards in the virtual store, each of the plurality of packs of cards comprising a visual representation; (iii) receiving selection of one or more of the plurality of packs of cards; (iv) providing the selection of the one or more the plurality of packs of cards; (v) receiving input from a user, the input indicating opening of the selected pack of cards; and (vi) causing feedback for the user corresponding to the opening of the selected pack of cards that at least partially mimics a physical opening of the selected pack of cards.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
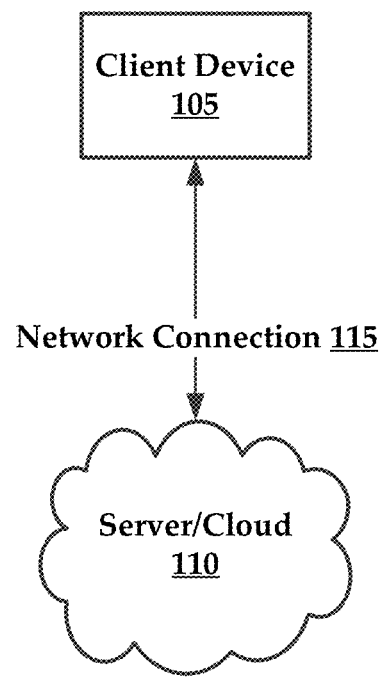
FIG. 1 is a block diagram of an exemplary architecture in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Embodiments of the present technology include methods in which an interactive software displays virtual boxes and packs of trading cards (e.g., trading, collectible or other type of card as described in greater detail below) and mimics or emulates the visual and audio feedback received when opening real boxes and packs of cards and allows for the player to interact with and open the virtual boxes and package of cards as if they were a tangible object, with the goal of providing satisfaction and engagement to the user through the use of touch screen and mouse interaction with the boxes and packs, allowing the software user to move, tear, flip, peel open the virtual boxes and packs of cards on screen with unique gestures taken in by a computer device.

Embodiments of the present technology may yield increased enjoyment, player engagement and player compulsion to open more packs of cards, driving them to acquire more packs of cards within the software either through continued use or play or by purchasing packs of cards in the software's virtual goods store.

These and other advantages of the present technology are provided in greater detail with reference to the drawings.

FIG. 1 is a block diagram of an exemplary architecture in which embodiments of the present technology may be practiced. According to some embodiments, the architecture may comprise a client device 105, which in some instances may comprise an end user computing device, a mobile computing device, or any other device capable of displaying graphical user interfaces and allowing an end user to interact with such GUIs.

The client device 105 may be communicatively coupled with a server 110 via a network 115, which may comprise any a local area network ("LAN"), a wide area network ("WAN"), or any other private or public network, such as the Internet. The network 115 may also comprise a telecommunications network.

Figure 8:
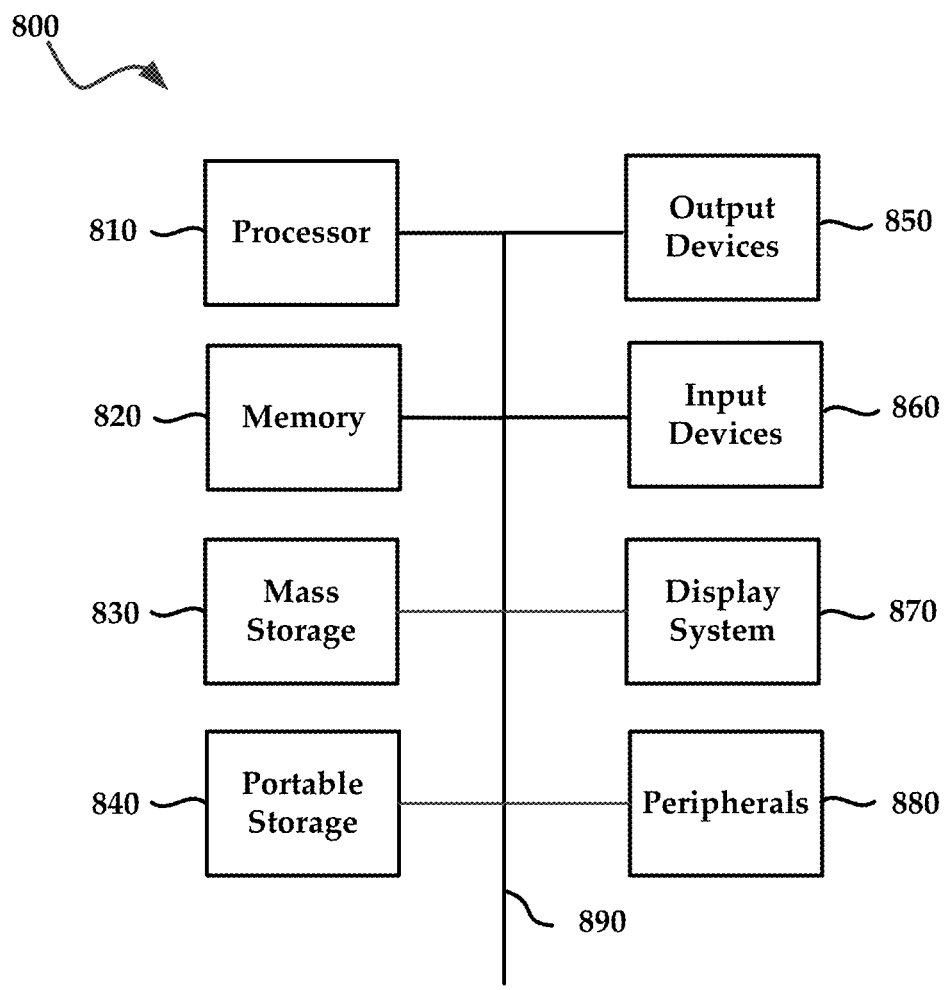
FIG. 8 illustrates an exemplary computing device that may be used to implement embodiments according to the present technology.

According to some embodiments, the server 110 may comprise any computing device, such as the computing device 800 (also referred to as system 800 and/or computer system 800) of FIG. 8. The server 110 includes one or more processors such as the one or more processors 810 of FIG. 8, and memory for storing executable instructions (e.g., logic) such as the main memory 820 of computing device 800. This logic, when executed by the one or more processors, is operable to perform operations, including the exemplary methods described herein.

In some instances, the functions of the server 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the server 110 may execute logic stored in memory to facilitate a method for control and visualization of representations of one or more boxes and/or packs of cards, referred to generally as "packages," allowing for the control and manipulation of the boxes and packs on screen. These packages may be displayed as components of a graphical user interface. The server 110 may allow for packages such as boxes and packs of cards to be flipped, ripped, torn or peeled open (reinforced through a variety of visual and audio cues) through gestures or other input into the client device 105 to reveal the card packs within the boxes and the cards within the packs. In other instances, boxes may be opened using corresponding gestures or input, exposing the contents of the boxes.

Stated concisely, the technical effect described herein is ability of the server 110 or other computing device to mimic the opening of a physical package, within a virtual environment. The system allows the user to receive feedback that provides visual, aural, and/or tactile feedback that represents the opening of a physical package.

Generally, the server 110 may execute logic via the one or more processors to generate a visual representation of a package, receive input from the user indicating opening of the package, and provide any of visual feedback and audio feedback to the user corresponding to the opening of the package. In some instances, the server 110 may cause feedback, which includes haptic feedback. The haptic feedback may allow the user to "feel" the tearing or opening of a package, providing real-world tactile feedback. It will be understood that the server 110 may "cause" feedback by transmitting signals to the client device 105 that cause the client device 105 to provide, for example, haptic feedback. For example, the server 110 may cause the client device 105 to vibrate in conjunction with a virtual opening of a package of cards.

In some embodiments, the representations of packages may be implemented within a single and/or multi-player game, which includes the packages. Visual representations of boxes and pack(s) of cards generated by the server 110, as well as opening of these packages by the server 110 may result exposure of the package contents (e.g., cards in a pack) on a display device of the client device 105. Additionally, the server 110 may generate visual and/or audio feedback that mimics/recreates the opening of a real package of cards, providing the user with the same sense of excitement and intrigue within the virtual experiences as compared to opening a package in the physical world.

One of ordinary skill in the art will appreciate that while the methods executed by the server 110 have been described as causing the presentation of visual or audio feedback on a client device 105, such as via a web browser client, it will be understood that the one or more processors of the client device 105 may also be configured to execute the methods described herein such that the server 110 may be excluded and/or utilized to augment the methods being executed on the client device 105.

The fashion in which the server 110 determines the contents of a package may be determined in a variety of fashions, from a purely random distribution of cards to a predetermined selection of cards. Either of these card distributions methods and any approach that would be known to one of ordinary skill in the art with the present disclosure before them may be determined locally on the client device 105 or over network 115 if the server 110 and client device are communicatively coupled via the Internet, for example.

In operation, the server 110 may authenticate a user utilizing predefined authentication credentials. The server 110 may allow the user to purchase trading card boxes, packages, and the like from a virtual store. For example, the software user may register/signup at or log in to an account at the virtual store. Registration may include providing payment information, such a real or virtual source(s) of currency.

In other embodiments, users may search, browse, and the like for desired trading cards (e.g., by card series, packaging, etc.) at the virtual store, which is generated by the server 110. In some instances, the user may be presented with a plurality of packages, such as trading card boxes. Using their client device 105, the user may select one or more of the plurality of packages.

Figure 2:
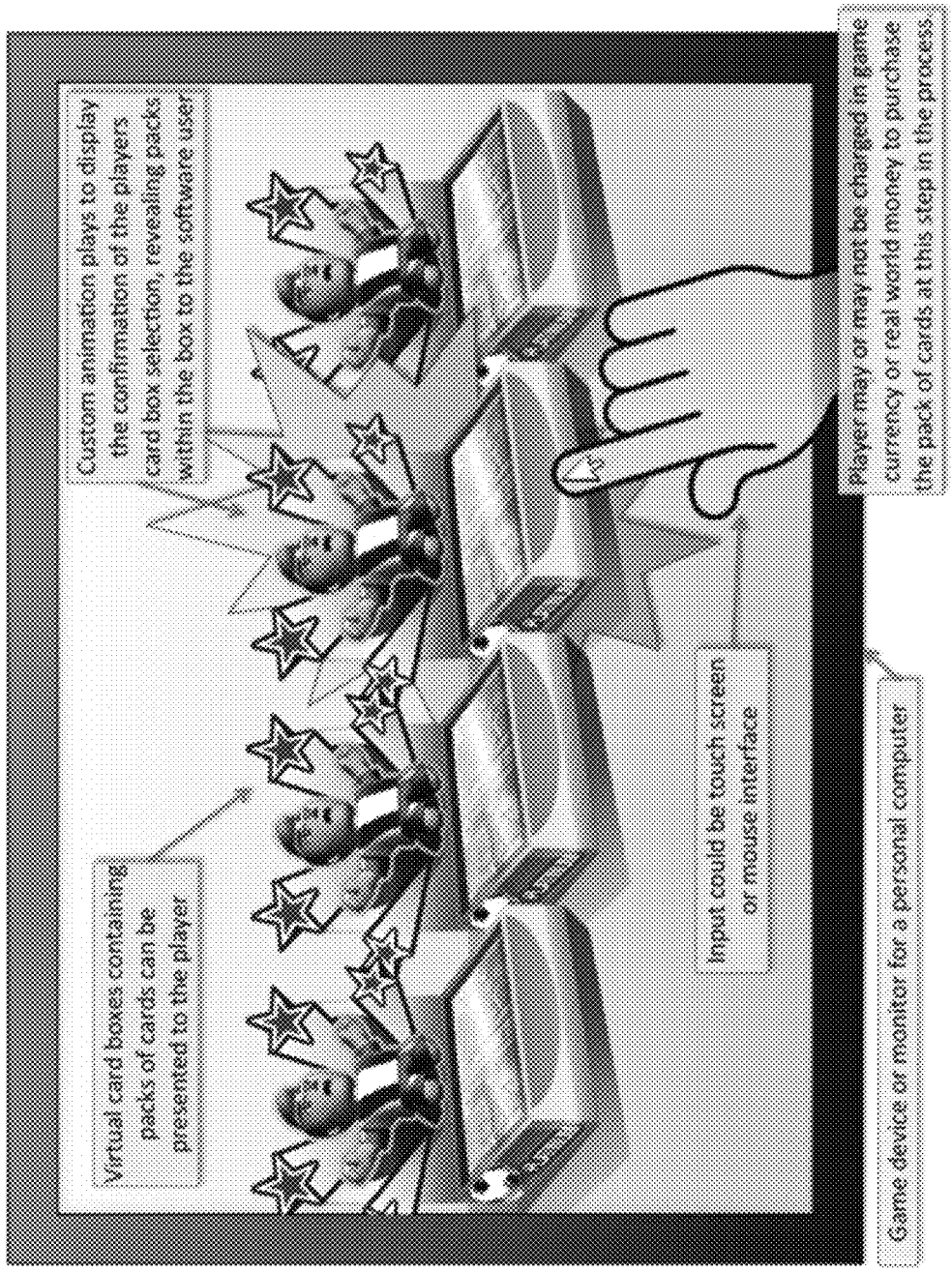
FIG. 2 illustrates the presentation of a plurality of packs of cards via a graphical user interface.

It will be understood that the packages and contents thereof may be tied to the particular computing environment or program being executed by the server 110. For example, in a videogame computing environment that includes a playing card-based game, the server 110 may generate and provide packs of game-specific packages of cards that can be opened by players. FIG. 2 illustrates the provision/presentation of a plurality of packages of cards via a graphical user interface.

Figure 3:
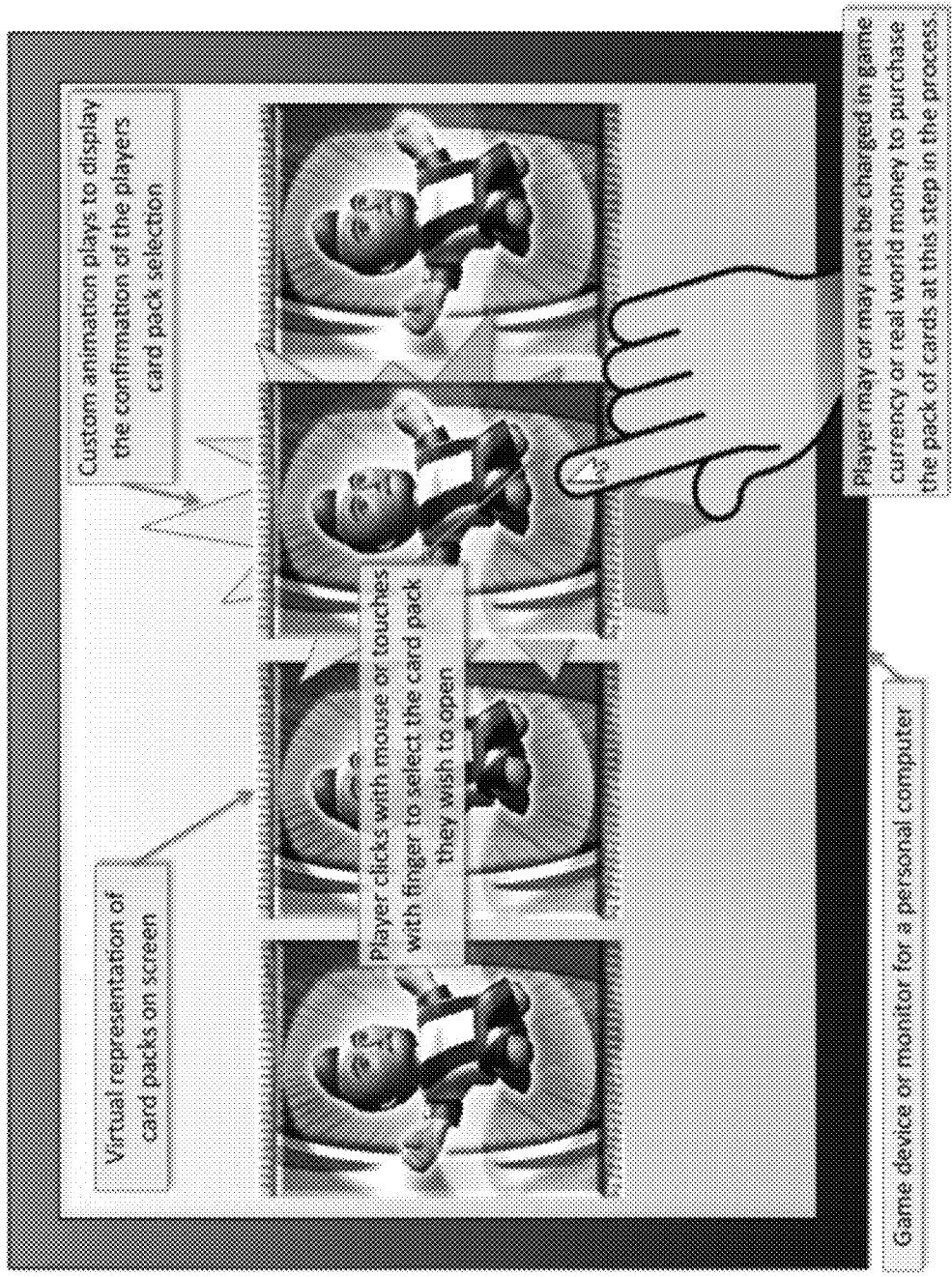
FIG. 3 illustrates selection of one or more of the plurality of packs of cards of FIG. 2.

Upon selection of a package(s) of cards, the player may open each package of cards in a variety of ways that may mimic/emulate the real life opening of a package of cards. It will be understood that the server 110 may manage a set of instructions that tie touch-based input to the execution of actions by the server 110. The selection of a package of cards is illustrated in FIG. 3

Figure 4:
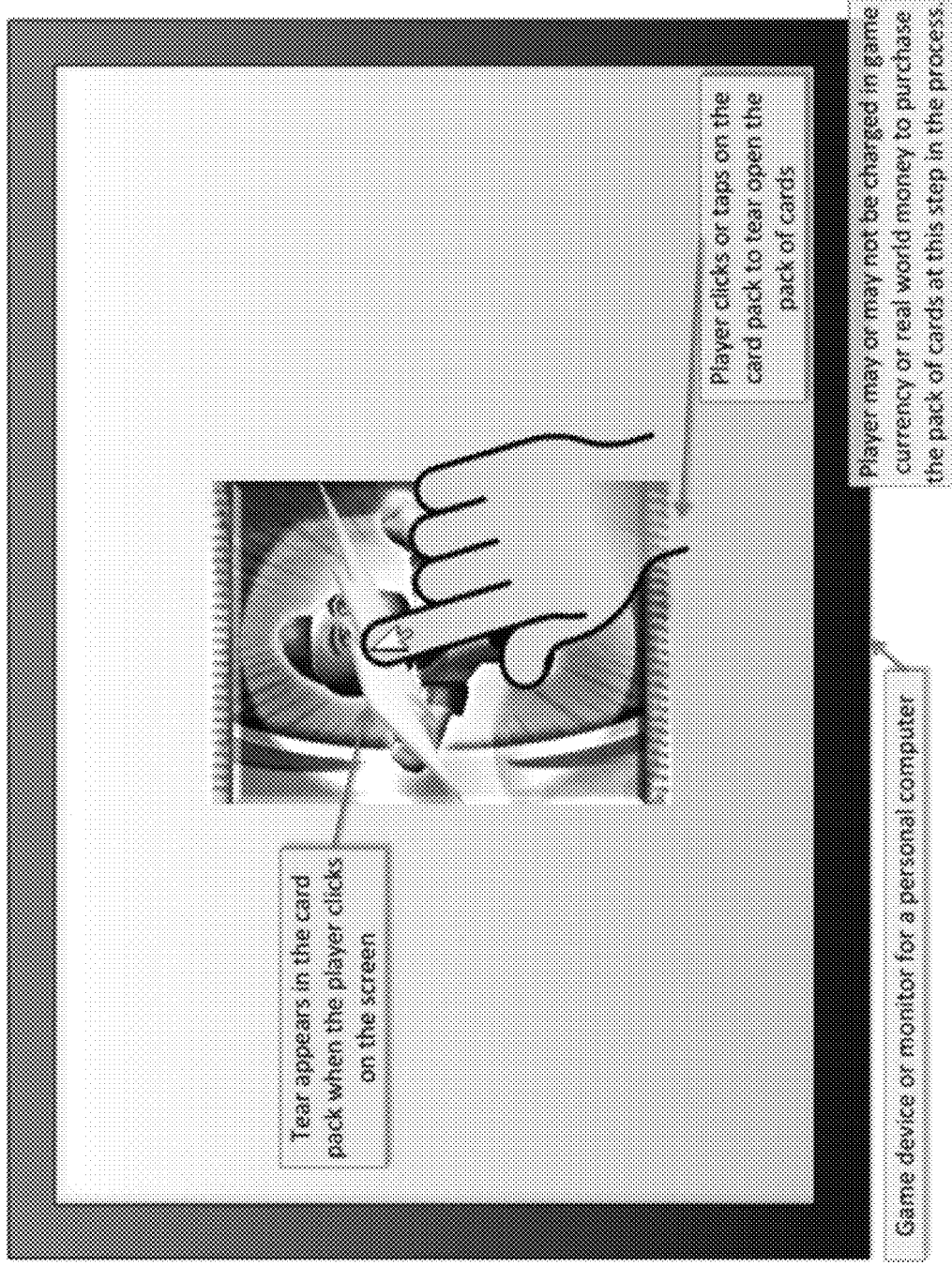
FIGS. 4-7 are graphical user interfaces that each illustrate the use of touch-based input to open a package within a virtual environment represented via a graphical user interface.

For example, a player may tap his or her finger or mouse pointer on the screen on top of the package of cards. This input may cause the server 110 to execute instructions which cuts or tears open the package of cards. The server 110 may execute a tearing animation as the player performs the action and/or an audio cue (e.g., sound effect(s)) may be played to reinforce the action. FIG. 4 illustrates exemplary tap and tear actions. It will be understood that the terms "touch-based input" may also include input received from one or more input devices that represent an interaction by the user within a virtual environment.

Figure 5:
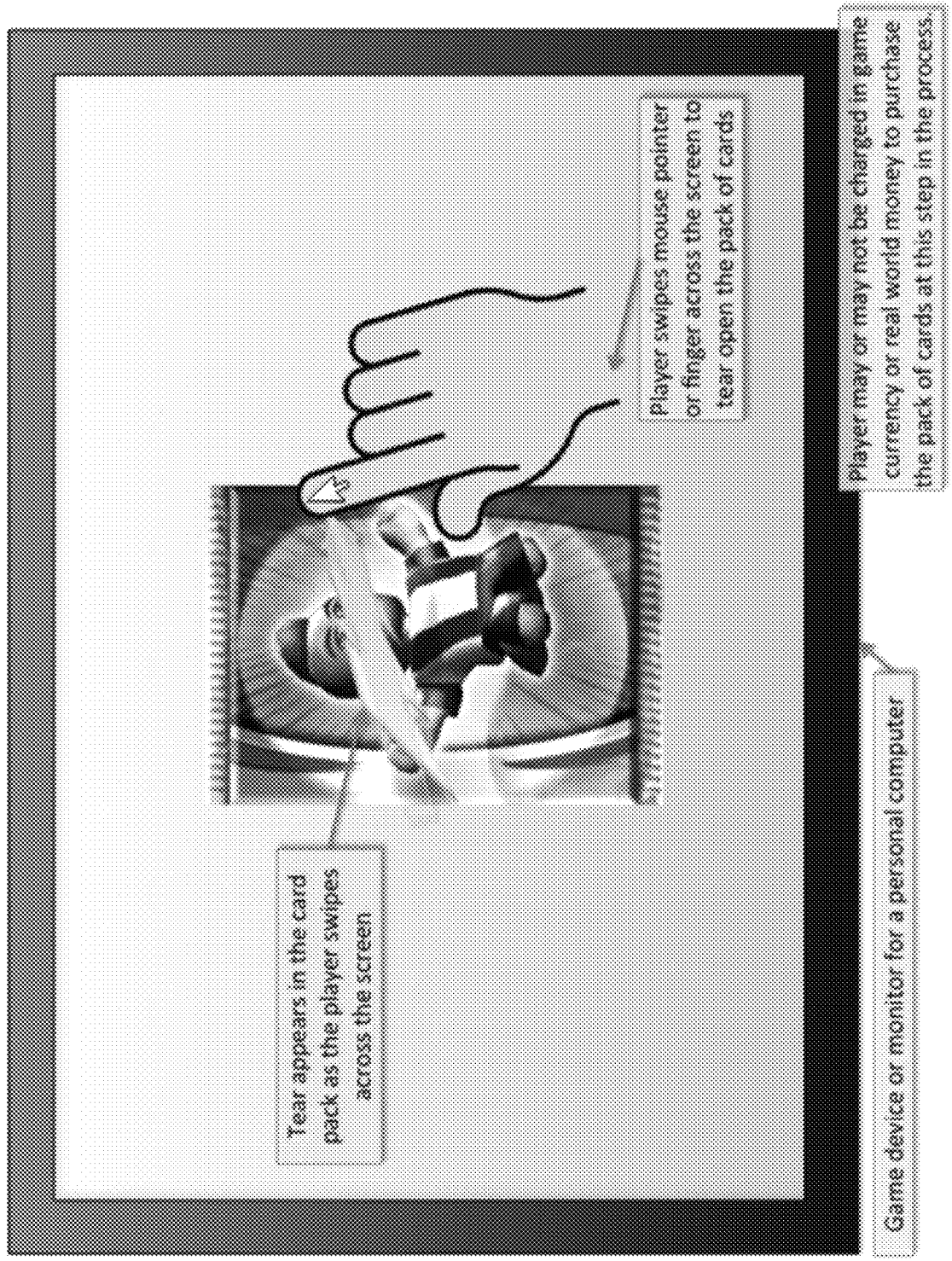

In another example, a player may swipe his or her finger or mouse pointer across the screen and over the package of cards. This input may cause the server 110 to execute instructions which cuts or tears open the package of cards across the line swiped by the player. That is, the swipe traces a path across the package of cards. The server 110 may execute a tearing animation as the player performs the action and an audio cue (e.g., sound effect(s)) may be played to reinforce the moment. FIG. 5 illustrates exemplary swipe and tear actions.

Figure 6:
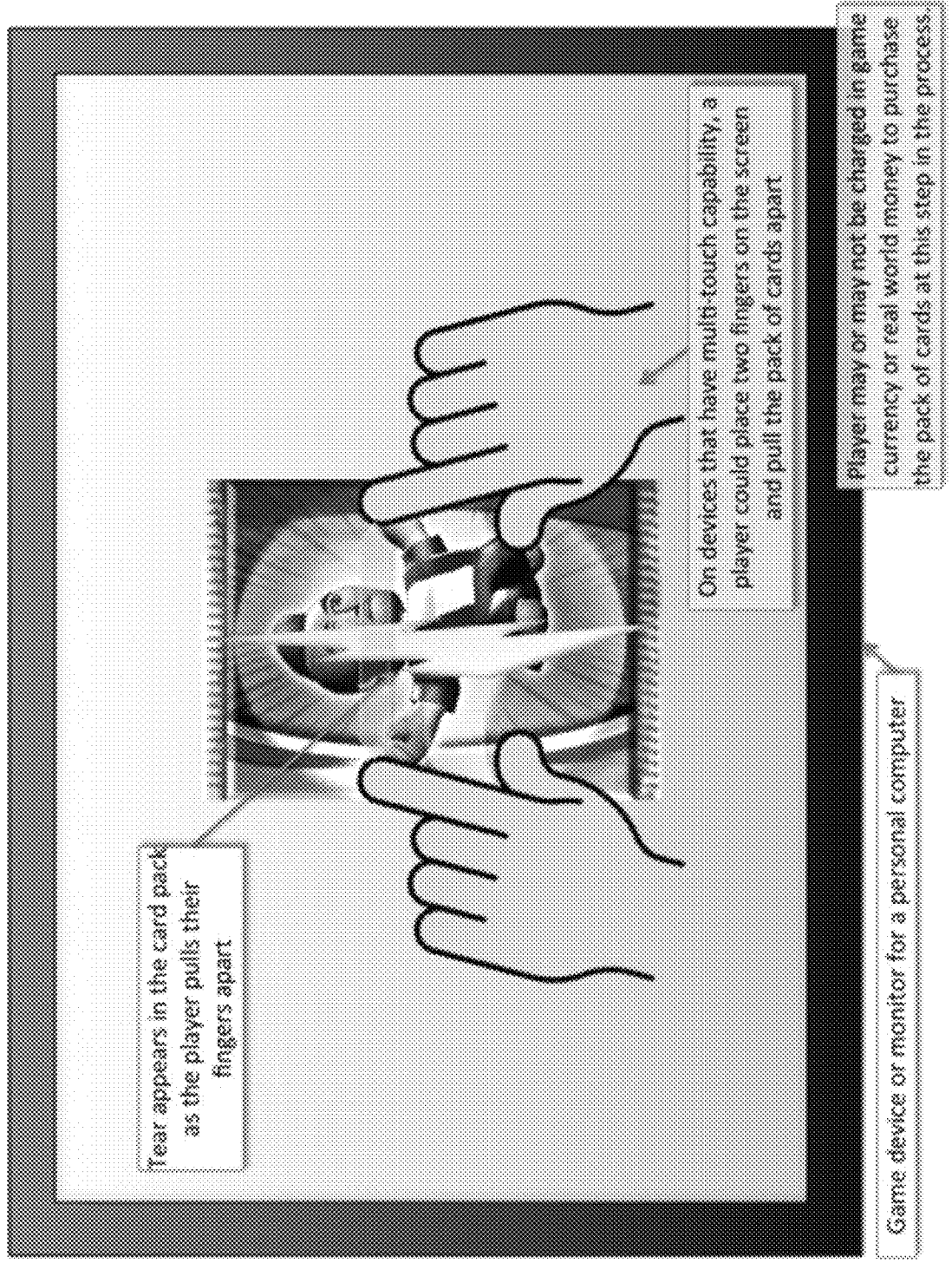

In yet another example, a player may utilize a touch-based input such as placing two fingers on the package of cards, one on either side of the representation of the package of cards on screen. When the player pulls their fingers apart (e.g., expand gesture), this action results in the server 110 executing a ripping open of the package of cards. The server 110 may execute a tearing animation as the player performs the action and an audio cue (e.g., sound effect(s)) may be played to reinforce the moment. It is noteworthy that the expand gesture causes the server 110 to provide a visual representation of the package of cards being ripped in a direction that is substantially parallel to the direction of gesture swipe. This tearing animation mimics the physical tearing of a package by grasping opposing sides of a package and pulling the package apart. FIG. 6 illustrates exemplary expand and tear actions.

Figure 7:

According to some embodiments, a player may utilize a touch-based input such as placing their finger on the corner of the package of cards, followed by a pause for a brief period of time. Alternatively the user may utilize their mouse and click their mouse pointer on a corner of the package of cards. In either input, the user may then pulls his or her finger (or mouse cursor) along a length of the package of cards causing the package of cards to be peeled open along the line of the direction of the finger or mouse movement. A peeling animation may be played as the player performs the action and an audio cue (e.g., sound effect(s)) may be played to reinforce the moment. FIG. 7 illustrates exemplary expand and tear actions.

According to some embodiments, tearing or otherwise opening of the package may expose at least a portion of the content thereof. For example, the server 110 may display cards from within an opened package of cards may to the player. The server 110 may automatically present the cards to the player through a predetermined animation. Alternatively, the player may pull the cards from the opened pack with the use of the touch interface or mouse controls. Other methods or processes for displaying the cards to the user that would be known by one of ordinary skill in the art may also be used in accordance with the present disclosure.

Trading cards included in some embodiments may typically be virtual representations of small rectangular cards, usually made out of paperboard or thick paper, which usually contain an image of a person, place or thing (fictional or real) and a short description of the picture, along with other text further describing attributes specific to the item in the image including such attributes as attacks, defenses, other abilities, physical characteristics, possessions, statistics, backstory, trivia, and the like. These cards are typically sold in boxes that contain several packs of cards with each package of cards containing a random sampling of the cards available in that particular collection. There is wide variation among the different types of cards that have been made available from differing configurations and content, the material used to make the cards, the pack wrapping and boxes (from papers, cardboards, plastics, metal foils, cloth and more). The aforementioned characteristics may be emulated or represented virtually to varying degrees.

In various embodiments, a collectible card game, also called a trading card game or customizable card game, is played using specially designed sets of virtual playing cards. For example, cards designed specifically for playing games may have fantasy subjects, sports subjects, and the like as the basis for game play. In some embodiments, the game may have rules including the player's objectives, categories of cards used in the game, and ways in which the cards interact.

FIG. 8 illustrates an exemplary computing device 800 that may be used to implement an embodiment of the present systems and methods. The system 800 of FIG. 8 may be implemented in the contexts of the likes of computing devices, networks, servers, or combinations thereof. The computing device 800 of FIG. 8 includes one or more processors 810 and main memory 820. Main memory 820 stores, in part, instructions and data for execution by processor 810. Main memory 820 may store the executable code when in operation. The system 800 of FIG. 8 further includes a mass storage device 830, portable storage device 840, output devices 850, user input devices 860, a display system 870, and peripheral devices 880.

The components shown in FIG. 8 are depicted as being connected via a single bus 890. The components may be connected through one or more data transport means. Processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 may store the system software for implementing embodiments of the present technology for purposes of loading that software into main memory 820.

Portable storage device 840 operates in conjunction with a portable non-volatile storage medium, such as a floppy disk, compact disk, digital video disc, or USB storage device, to input and output data and code to and from the computer system 800 of FIG. 8. The system software for implementing embodiments of the present technology may be stored on such a portable medium and input to the computer system 800 via the portable storage device 840.

User input devices 860 provide a portion of a user interface. User input devices 860 may include an alphanumeric keypad, such as a keyboard, for inputting alphanumeric and other information, or a pointing device, such as a mouse, a trackball, stylus, or cursor direction keys. Additional user input devices 860 may comprise, but are not limited to, devices such as speech recognition systems, facial recognition systems, motion-based input systems, gesture-based systems, and so forth. For example, user input devices 860 may include a touchscreen. Additionally, the system 800 as shown in FIG. 8 includes output devices 850. Suitable output devices include speakers, printers, network interfaces, and monitors.

Display system 870 may include a liquid crystal display (LCD) or other suitable display device. Display system 870 receives textual and graphical information, and processes the information for output to the display device.

Peripherals device(s) 880 may include any type of computer support device to add additional functionality to the computer system. Peripheral device(s) 880 may include a modem or a router.

The components provided in the computer system 800 of FIG. 8 are those typically found in computer systems that may be suitable for use with embodiments of the present technology and are intended to represent a broad category of such computer components that are well known in the art. Thus, the computer system 800 of FIG. 8 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system comprising:
one or more processors; and
logic encoded in one or more tangible media for execution by the one or more processors and when executed operable to perform operations comprising:
transmitting a visual representation of a package of a set of virtual cards to a client device for display to a user;
receiving a touch-based input from the user on the package displayed via a graphical user interface of the client device, the touch-based input indicating opening of the package by the user;
transmitting, to the client device, signals that are used by the client device to provide haptic feedback to the user from the client device in conjunction with the opening of the package, the opening of the package comprising tearing of the package so as to expose at least one of the set of virtual cards; and
generating for display the at least one of the set of virtual cards on the graphical user interface.

2. The system according to claim 1, wherein the haptic feedback causes the client device to vibrate.

3. The system according to claim 1, wherein the opening of the package further comprises a tearing animation as the user performs the touch-based input.

4. The system according to claim 1, wherein the opening of the package further comprises a sound effect to reinforce the opening of the package as the user performs the touch-based input.

5. The system according to claim 1, wherein the opening of the package further comprises a tearing animation and a sound cue as the user performs the touch-based input.

6. The system according to claim 1, wherein the logic when executed is further operable to perform operations comprising:
providing a plurality of selections of packages to the user, each of the selections comprising a visual representation of a package; and
receiving a selection of at least one of the plurality of selections of packages.

7. The system according to claim 1, wherein the touch-based input comprises a tap input relative to the package, the tap input causing the one or more processors to execute the logic to perform operations comprising a tearing animation of at least a portion of the package as the user performs the touch-based input.

8. The system according to claim 1, wherein the touch-based input comprises a swipe input relative to the package, the swipe input tracing a path across at least a portion of the package, the swipe input causing the one or more processors to execute the logic to perform operations comprising executing a tearing animation of the package along the path as the user performs the touch-based input.

9. The system according to claim 1, wherein the touch-based input comprises a touch-based input proximate to a corner of the package followed by a drag gesture, which causes the one or more processors to execute the logic to perform operations comprising a package opening animation of the package in a direction that is substantially aligned to the direction of the drag gesture.

10. The system according to claim 1, wherein the package comprises a box of virtual cards and opening of the box of virtual cards exposes one or more virtual cards within the box.

11. A client device comprising:
one or more processors; and
logic encoded in one or more tangible media for execution by the one or more processors and when executed operable to perform operations comprising:
receiving a selection of one of a plurality of packs of virtual cards displayed on a graphical user interface of the client device, the selection received from a user of the client device;
transmitting a visual representation of a package of the selected pack of virtual cards to the client device for display to the user;
displaying the selected pack of virtual cards on the graphical user interface to the user;
receiving a touch-based input at the graphical user interface from the user on the selected pack of virtual cards, the touch-based input indicating opening of the selected pack of virtual cards;
transmitting, to the client device, signals that are used by the client device to provide haptic feedback to the user from the client device in conjunction with a package opening animation to the user as the user performs the touch-based input, the package opening animation providing a visual cue mimicking a physical opening of the package, the opening of the package comprising tearing of the package so as to expose at least one card of a set of virtual cards; and
displaying the set of virtual cards of the selected pack of virtual cards on the graphical user interface.

12. The client device according to claim 11, further comprising providing feedback to the user corresponding to the opening of the selected pack of virtual cards, the feedback comprising an animation that represents the opening of the selected pack of virtual cards.

13. The client device according to claim 11, further comprising providing feedback to the user corresponding to the opening of the selected pack of virtual cards, the feedback comprising a sound associated with the opening of the selected pack of virtual cards.

14. The client device according to claim 11, wherein, following the opening of the selected pack of virtual cards, displaying a plurality of virtual cards from within the opened selected pack of virtual cards.

15. The client device according to claim 11, wherein the performed operations further comprise a game environment, the game environment comprising a virtual store including the plurality of packs of virtual cards.

16. The client device according to claim 11, further comprising playing a custom animation to display confirmation of the selection of the one of the plurality of packs of virtual cards.

17. A method comprising:
  transmitting a visual representation of a package of a set of virtual cards to a client device for display to a user;
  receiving a touch-based input on the package of the set of virtual cards, the package displayed to the user via a graphical user interface of the client device, the touch-based input indicating opening of the package of the set of virtual cards;
  transmitting, to the client device, signals that are used by the client device to provide haptic feedback to the user from the client device in conjunction with a package opening animation to the user as the user performs the touch-based input, the package opening animation providing a visual cue mimicking a physical opening of the package, the opening of the package comprising tearing of the package so as to expose at least one card of the set of virtual cards; and
  generating for display the at least one card of the set of virtual cards on the graphical user interface.

18. The method according to claim 17, further comprising providing an audio cue as the user performs the touchbased input, the audio cue providing an auditory cue mimicking the physical opening of the package.

19. The method according to claim 17, further comprising providing the haptic feedback and an audio cue as the user performs the touchbased input, the haptic feedback providing a tactile cue mimicking the physical opening of the package, the audio cue providing an auditory cue mimicking the physical opening of the package.

20. The method according to claim 17, further comprising executing a program environment that includes a virtual store, the virtual store comprising a plurality of packages, the plurality of packages including the package.

* * * * *